Figure 7:
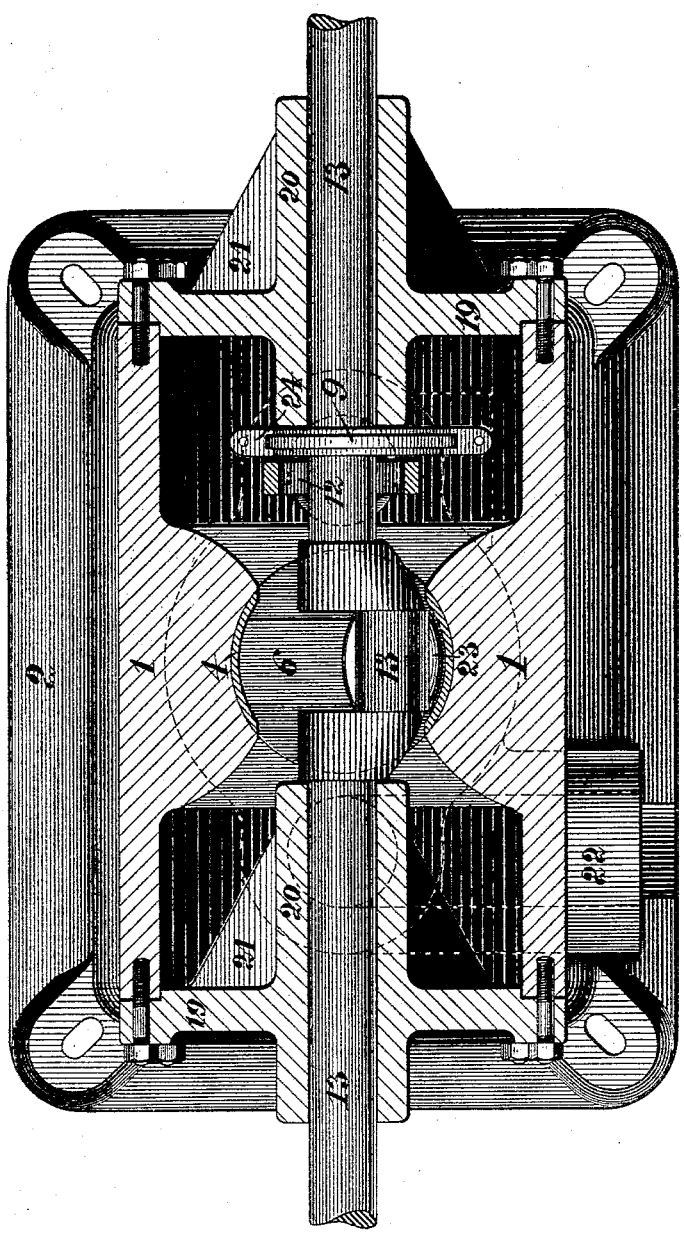

(No Model.)   7 Sheets—Sheet 1.
R. H. MATHER.
STEAM ENGINE.
No. 388,059.   Patented Aug. 21, 1888.
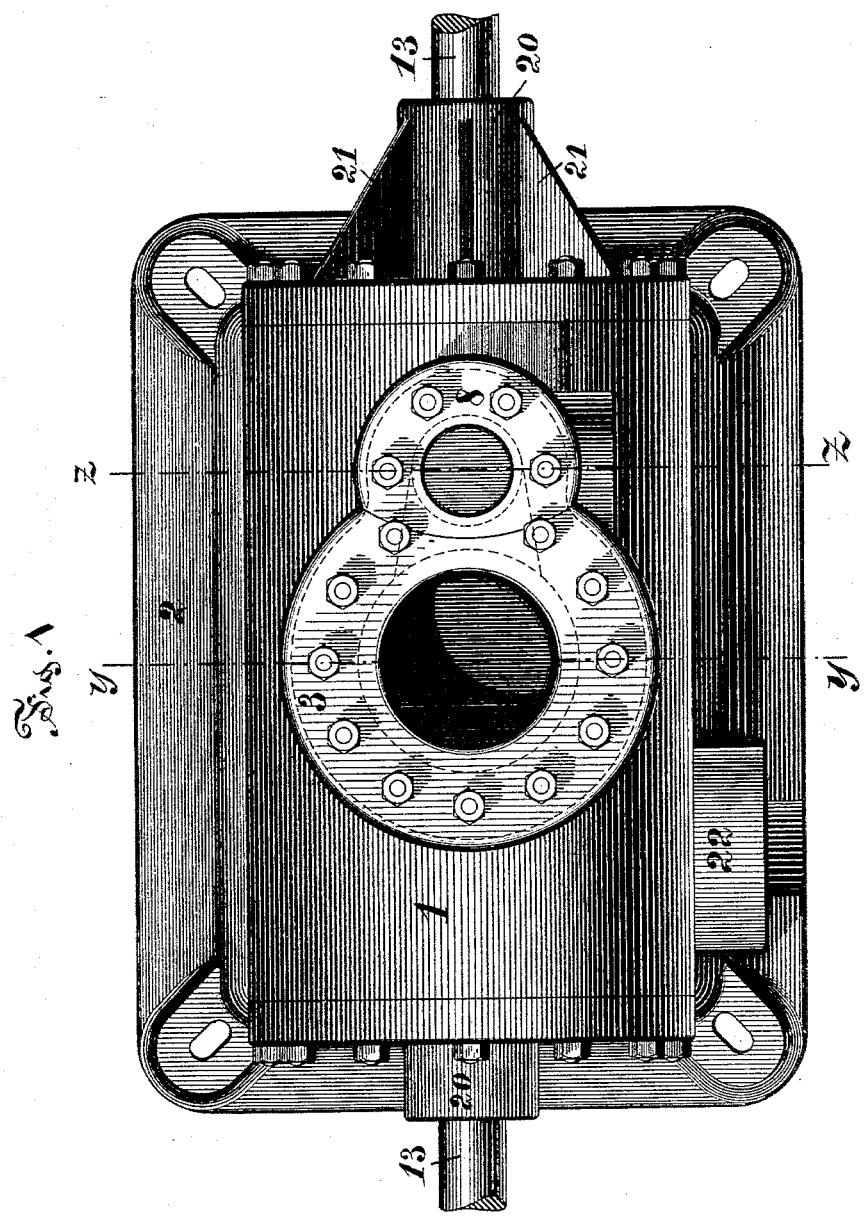
Witnesses:
W. M. Bjorkman
H. R. Williams
Inventor:
Richard H. Mather,
By Willard Eddy,
Atty.

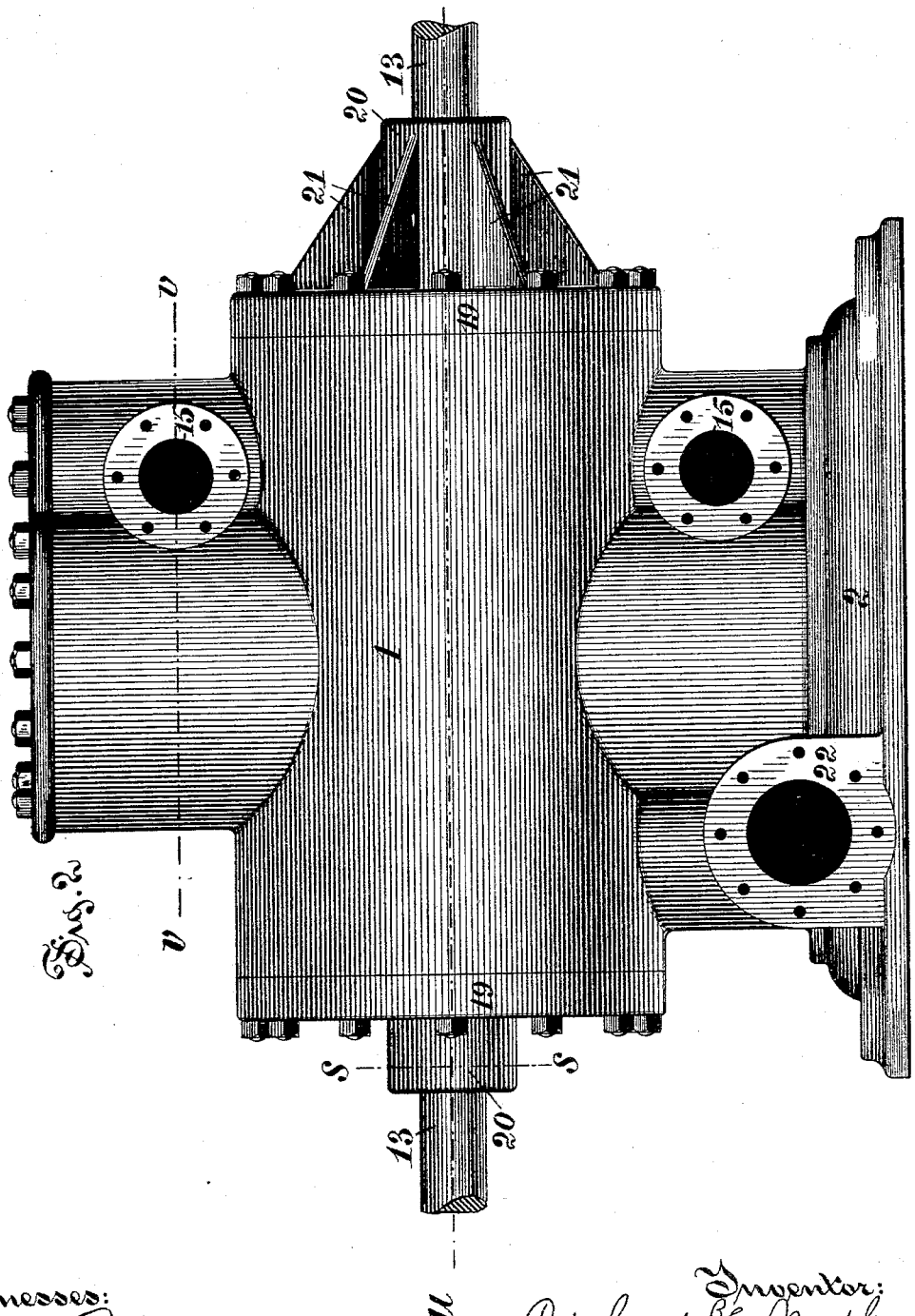

(No Model.) 7 Sheets—Sheet 3.
R. H. MATHER.
STEAM ENGINE.
No. 388,059. Patented Aug. 21, 1888.
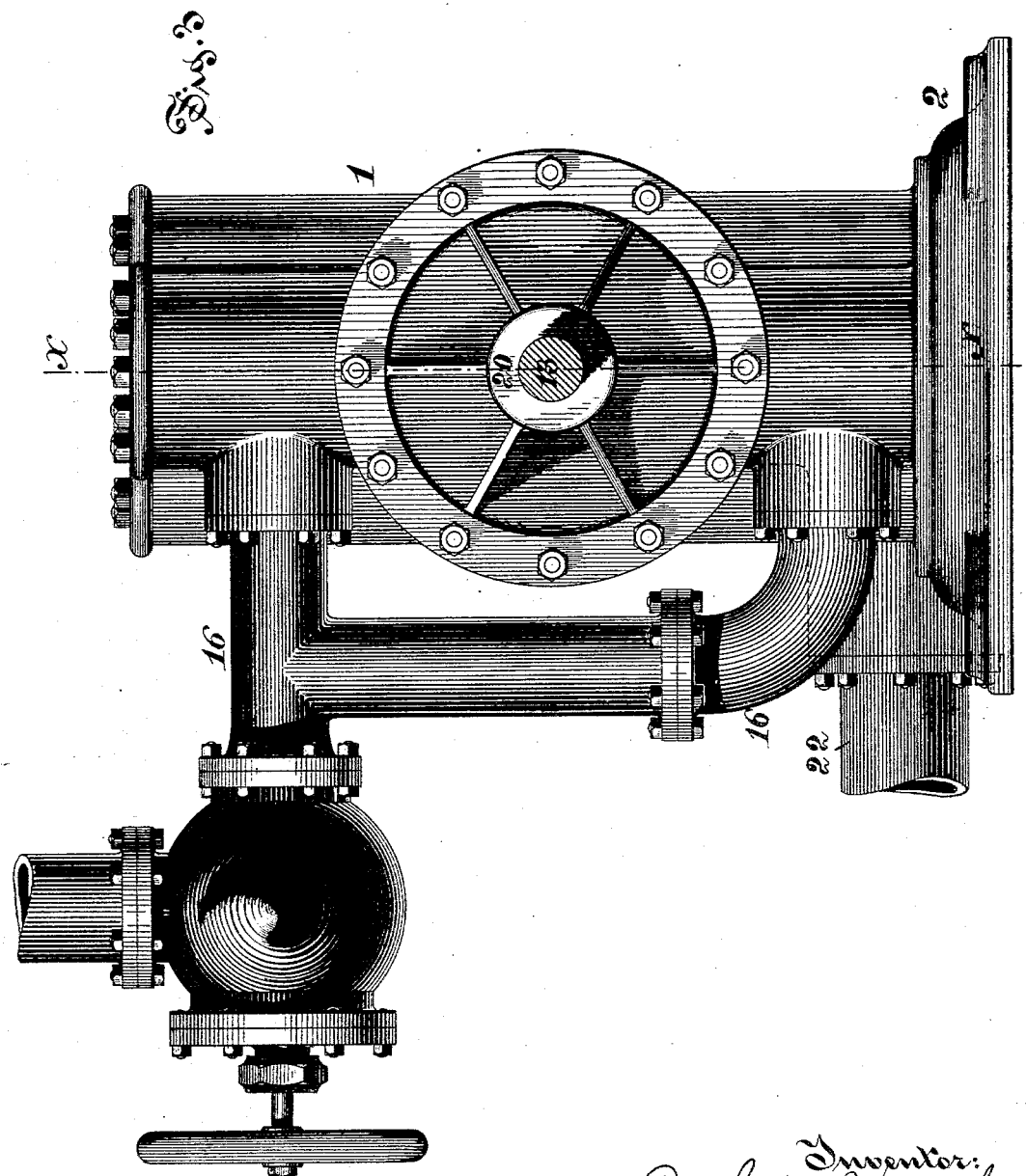

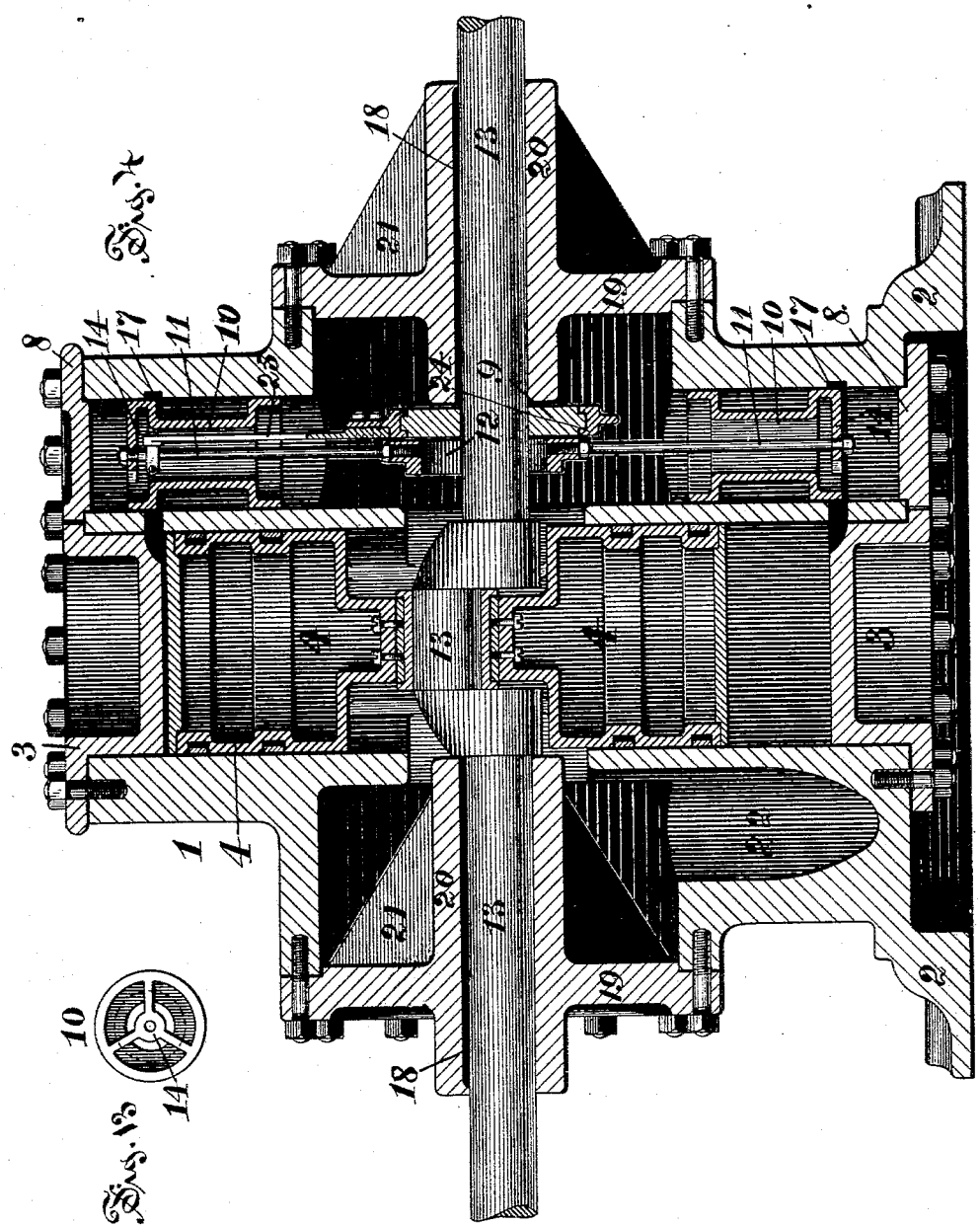

(No Model.) 7 Sheets—Sheet 5.
R. H MATHER.
STEAM ENGINE.
No. 388,059. Patented Aug. 21, 1888.
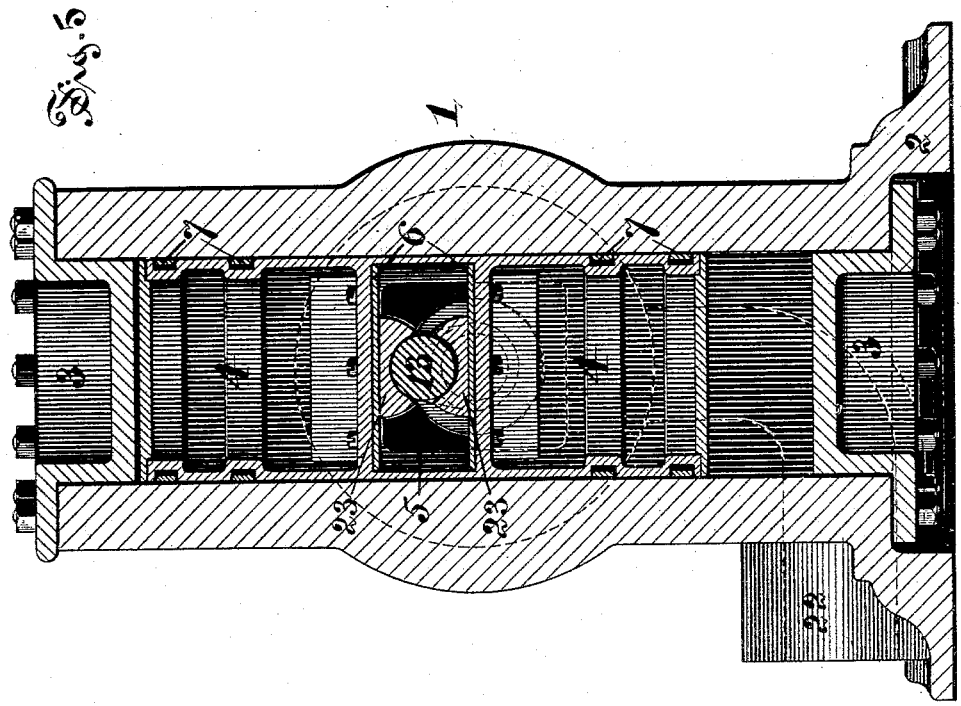
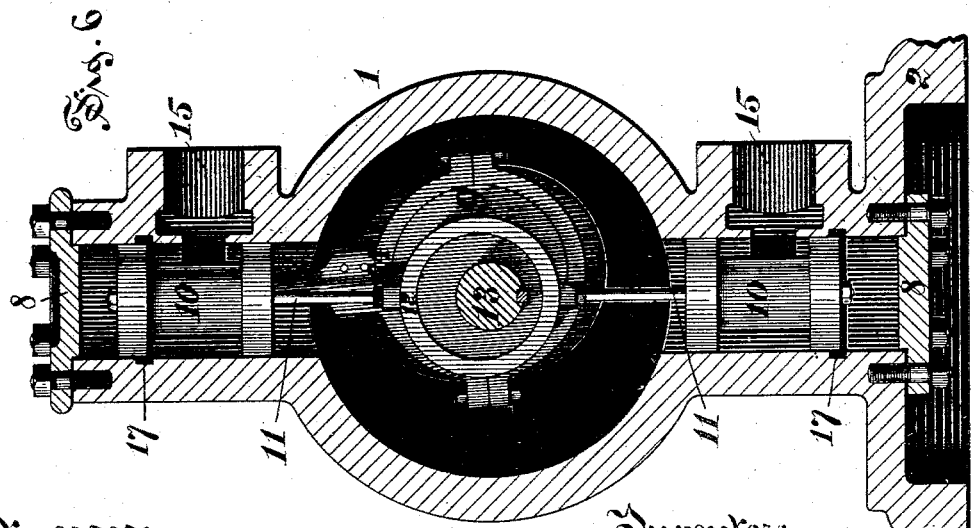
Witnesses:
W. M. Bjorkman
H. P. Williams
Inventor:
Richard H. Mather,
By Willard Eddy, Atty (No Model.) 7 Sheets—Sheet 6.

R. H. MATHER.
STEAM ENGINE.

No. 388,059. Patented Aug. 21, 1888.

Witnesses:
Wm. Bjorkman
H. R. Williams

Inventor
Richard H. Mather,
By Willard Eddy,
Atty.

(No Model.) 7 Sheets—Sheet 7.
R. H. MATHER.
STEAM ENGINE.
No. 388,059. Patented Aug. 21, 1888.
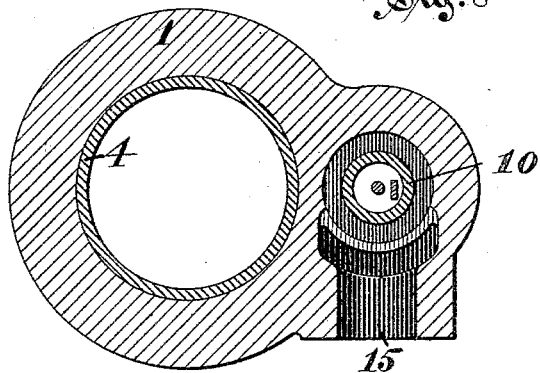
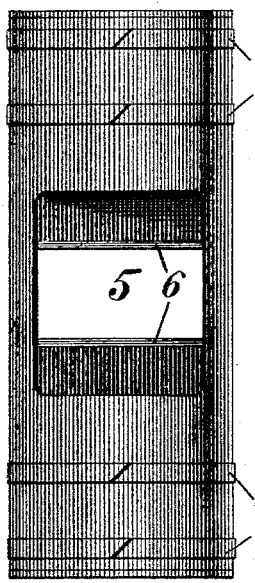
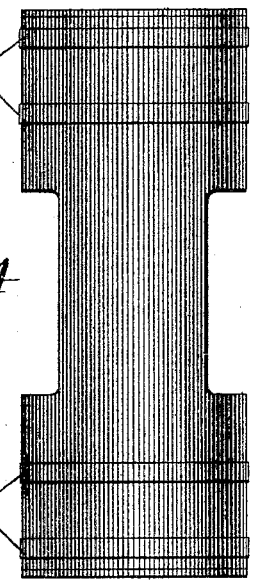
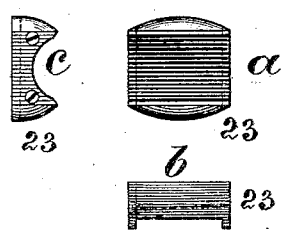
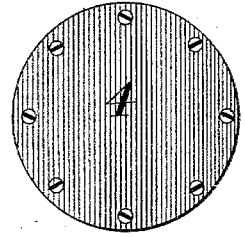
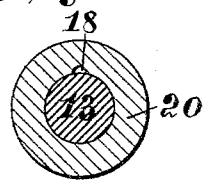
Witnesses:
W. M. Bjorkman
H. R. Williams
Inventor:
Reichard H. Mather,
By Willard Eddy,
Atty.

UNITED STATES PATENT OFFICE.

RICHARD H. MATHER, OF WINDSOR, CONNECTICUT.

STEAM-ENGINE.

SPECIFICATION forming part of Letters Patent No. 388,059, dated August 21, 1888.

Application filed April 25, 1887. Serial No. 236,000. (No model.)

*To all whom it may concern:*

Be it known that I, RICHARD H. MATHER, of Windsor, in Hartford county, Connecticut, have invented certain new and useful Improvements in Steam-Engines, which improvements are described in the following specification, and are illustrated by the accompanying drawings.

This invention is a vertical double-acting high-speed steam-engine, and is designed with a view to strength, compactness, and efficiency.

Figures 1 and 2 of said drawings are a top view and a side view of the engine, respectively. Fig. 3 is an end view of the same, including a portion of the steam-pipe. Fig. 4 is a vertical section on $x\,x$ of Fig. 3. Figs. 5 and 6 are vertical sections on $y\,y$ and $z\,z$, respectively, of Fig. 1. Figs. 7 and 8 are horizontal sections on $u\,u$ and $v\,v$, respectively, of Fig. 2. Figs. 9 to 14, inclusive, are details.

The frame of the engine is a hollow iron casting of irregular form, exhibited in Figs. 1 to 8, inclusive, and indicated by the numeral 1. In this single piece of metal are cast the steam-cylinders, valve-chambers, and crank-case described below. This frame incloses the moving parts of the engine, is provided with supply and exhaust ports, and expands laterally at the bottom to form base 2, through which the engine is bolted to its foundation. The steam-cylinders and a part of the crank-chamber constitute the main and central compartment of frame, 1. The cylinder-heads 3 and 3 cover the outer ends of the cylinders only, the inner ends being uncovered and opening directly into the chamber of the crank-case. These cylinders are supplied with a single steam-piston, 4, which is seen in Figs. 4, 5, 8, 9, 10, and 11. Figs. 8 and 10 are side views of said piston, and Fig. 11 is an end view of the same. The piston consists of a single cylindrical iron casting and two heads, which are bolted to its opposite ends. The two end portions of this casting being hollow, for the sake of lightness, form two separate chambers, which are respectively closed by said heads against all entrance of steam. The middle portion of the piston is of irregular form and partly discontinuous, leaving a space which is seen at 5 in Fig. 9, and is designed to accommodate the crank-pin, as described below. Above and below space 5 two smooth metallic plates, 6 and 6, are respectively bolted to piston 4 in parallel positions, as shown in Figs. 5 and 9. This construction is, in effect, a slotted cross-head formed in a steam-piston. The piston is packed in the usual manner with four sprung rings, 7.

Adjacent to the first-mentioned and principal chamber within frame 1 is a second chamber extending vertically through said frame and stopped at the top and bottom by heads 8 and 8, which are shown in Figs. 1, 4, and 6. The upper and lower portions of this chamber, being of cylindrical form, constitute the casing of the piston-valves, which are described below, while the middle portion of said chamber, being enlarged, as shown in Figs. 4 and 6, forms a portion of the chamber of the crank-shaft and accommodates the eccentric 9. Said casings are provided with two cylindrical valve-pistons, 10 and 10, which are duplicates of each other. Each of these pistons consists of two heads and an intermediate neck and is hollow throughout. Both pistons 10 are rigidly connected with each other by means of a rod, 11, which has a central annular expansion, 12, about the crank-shaft 13. Rod 11 is attached to pistons 10 by spiders 14 and 14, which are located within said pistons, respectively. One of said spiders is seen in Fig. 13, which is an end view of said piston. The valve-casing has inlet-ports 15 and 15, which are shown in Figs. 2, 6, and 8. To each of these ports leads a branch of the steam-pipe 16, which is shown in Fig. 3. The valve-casing has also ports 17 and 17, whereby said valve-chambers and steam-cylinders intercommunicate, as shown in Fig. 4. These ports 17 extend quite around the interior of the valve-casing, as indicated in Figs. 4 and 6.

The crank-shaft 13 extends through the middle of frame 1 and is journaled in heads 19 and 19, which are bolted to said frame, as seen in Figs. 4 and 7. The crank-shaft bearings are the hubs or sleeves 20 and 20, which are formed in the middle of said heads 19 and 19 and are re-enforced by ribs 21, for the sake of steadiness, as shown in Figs. 1, 2, 4, and 7. In each sleeve 20 is an internal longitudinal groove, 18, which opens at one end into the chamber of the crank-shaft, and is seen in Fig. 4 and also in Fig. 14, which is a cross-section of sleeve 20 on line $ss$ of Fig. 2. The exhaust-port 22 communicates with the interior of frame 1, as shown in Figs. 1, 2, 4, and 7.

The crank-pin is fitted into a sliding box, 23, which is shown in Figs. 5 and 12. In Fig. 12, $a$ is a top view of the lower half of the box 23, while $b$ and $c$ are a side view and an end view of the same, respectively. Box 23 is so constructed that between its upper and lower segments, at each side of the box, as seen in Fig. 5, a portion of the crank-pin is exposed to the exhaust, for the purpose of lubrication, hereinafter described. The top and bottom of this box are flat, and are provided with projecting lips or guides, (seen in the lower part of $b$ in Fig. 12,) which fit over the edges of slides 6 and 6.

For convenience in assembling the parts of the engine, one of the lips upon each segment of box 23 is separable therefrom, as illustrated at $c$ in Fig. 12. The eccentric 9 is set upon the crank-shaft, and provided in the usual manner with strap 24, which is seen in Figs. 4, 6, and 7. Stem 25 is rigidly attached to strap 24, and is pivoted to rod 11, as seen in Fig. 4. As eccentric 9 and piston 10 are quite near together, stem 25 is made longer than the maximum distance between them, and is carried into the hollow interior of said piston for the purpose of diminishing the angular motion of said stem. Steam-pipe 16 is provided with a throttle-valve, as indicated in Fig. 2.

The remaining features and particulars of construction of my improved engine sufficiently appear from the drawings and from the mode of operation. The latter needs but little explanation. Upon the opening of the throttle-valve steam is admitted by ports 15 and 15 to the annular chambers which are formed between the two heads and neck of each piston 10 and the surrounding valve-cylinder, and thence escapes into the steam-cylinder by ports 17 and 17, alternately. The same ports, 17 and 17, also serve, alternately, as exhaust-ports, through which the steam escapes to the valve-chambers beyond the valve-piston. The exhaust-steam thence passes through the hollow pistons 10 to the central chamber of the valve-casing, and thence follows the chamber of the crank-shaft and the central aperture, 5, of the steam-piston to and through exhaust-port 22. As the steam-piston reciprocates vertically in the steam-cylinder, the box 23, sliding between plates 6 and 6, reciprocates horizontally in space 5, and the throw of the crank is less than the diameter of the piston. The moving parts of the engine are located in the exhaust, as shown in the drawings; and an oil-lubricator, which is not shown in the drawings, is applied to the steam-pipe, so that in the operation of the engine a mixture of steam and oil is dispersed upon all contact-surfaces, including the main bearings, which are reached through grooves 18. In this manner the whole engine is effectually lubricated.

Such being the construction and operation of my improved engine, I claim as my invention—

1. A steam-cylinder, in combination with a double steam-piston consisting of two single hollow pistons and an intermediate slotted connection, which are formed of a single piece of metal and have a continuous bearing-surface within said cylinder from end to end of said piston, substantially as and for the purpose specified.

2. A double steam-piston consisting of two single pistons and an intermediate cylindrical connection, all formed of a single piece and being of uniform diameter, but cut away in the middle of said connection and provided with a slotted cross-head, in combination with a steam-cylinder within which said piston has a continuous bearing-surface from end to end of said piston, substantially as and for the purpose specified.

3. In a steam-engine, a steam-cylinder having a continuous interior bearing-surface from end to end, and having central openings into the crank-shaft chamber, in combination with a double steam-piston consisting of two hollow steam-tight single pistons and an intermediate slotted connection which has an external bearing-surface against the interior of said cylinder continuously with said single pistons, substantially as and for the purpose specified.

4. In a steam-engine, a crank-shaft, a crank, a crank-shaft chamber through which the exhaust-steam is conducted, two steam-cylinders having a common axis and opening into said chamber, and a double steam-piston reciprocating in said cylinders and provided with a slotted cross-head, in combination with a crank-pin box consisting of two cylindrically-concave blocks which are set upon opposite sides of the crank-pin at a distance from each other, whereby a portion of the bearing-surface of said crank-pin is exposed to lubrication between said blocks, substantially as and for the purpose specified.

5. In a steam-engine, a double steam-piston consisting of two single pistons and an intermediate cylindrical connection, all formed of a single piece of metal and having a uniform diameter, but cut away in the middle of said connection and provided with a central slotted cross-head, in combination with a crank-pin box consisting of two separate blocks having cylindrically-concave bearing-surfaces and provided with a removable lip, substantially as and for the purpose specified.

6. In a steam-engine, a steam-piston which is formed of a single piece of metal and contains a slotted cross-head, in combination with a crank-pin box which is formed of two cylindrically-concave blocks and is provided with a removable lip, substantially as and for the purpose specified.

7. In a steam-engine, a double steam-piston consisting of two single pistons and an intermediate cylindrical connection, all formed of a single piece and being of uniform diameter, but cut away in the middle of said connection and provided with a central slotted cross-head, in combination with a crank-pin box which is provided with a removable lip, substantially as and for the purpose specified.

8. A steam-piston cylinder which is formed of a single piece of metal and contains a slotted cross-head, in combination with a crank-pin box which is provided with a removable lip, substantially as and for the purpose specified.

9. A double steam-piston consisting of two single pistons and an intermediate cylindrical connection, all formed of a single piece and being of uniform diameter, but cut away in the middle of said connection and provided with a central slotted cross-head, in combination with a steam-cylinder, within which said piston has a continuous bearing-surface from end to end of said piston, in combination with a crank-pin box which is adapted to reciprocate in said cross-head, substantially as and for the purpose specified.

10. In a steam-engine, a crank, a crank-shaft, a crank-shaft chamber which extends from one to the other of the main bearings and is provided with inlet and outlet ports, a steam-cylinder having central openings into said chamber and having a continuous bearing-surface from end to end of said cylinder, and a double steam-piston consisting of two single pistons and an intermediate slotted cross-head, which are formed of a single piece of metal and have a continuous bearing surface within said cylinder from end to end of said piston, said cross-head being a part of the only channel of communication between said ports, in combination with a crank-pin box consisting of two cylindrically-concave blocks which are set in said cross-head upon opposite sides of the crank-pin at a distance from each other, whereby a portion of the crank-pin is exposed in said channel between adjacent edges of said blocks, substantially as and for the purpose specified.

11. In a steam-engine, an exhaust-chamber which extends from one to the other of the main bearings of the crank-shaft and consists of two compartments, one of which has an inlet-port and the other of which has an outlet-port, in combination with a steam-piston having a central cross-head provided with a slot which is the only channel of intercommunication between said compartments, substantially as and for the purpose specified.

12. In a steam-engine, a crank and crank-shaft, a crank-shaft chamber having an outlet-port, two steam-cylinders having a common axis and opening into said chamber, and a steam-piston reciprocating in said cylinders and said chamber and having a central transverse aperture for the accommodation of a sliding crank-pin box, in combination with a valve-casing which opens into said chamber and two hollow valve-pistons which reciprocate in said casing, all being so disposed that the exhaust is conducted through said valve-pistons and casing and through said crank-shaft chamber and steam-piston aperture, substantially as and for the purpose specified.

13. In a steam-engine, an exhaust-chamber consisting of two compartments whose only channel of intercommunication is a slotted cross-head of the steam-piston, substantially as and for the purpose specified.

In testimony whereof I have hereunto subscribed my name in the presence of two witnesses.

RICHARD H. MATHER.

Witnesses:
H. R. WILLIAMS,
WILLARD EDDY.